(12) United States Patent
Rago

(10) Patent No.: US 6,237,322 B1
(45) Date of Patent: May 29, 2001

(54) OIL PUMP

(75) Inventor: Giusseppe Rago, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 09/337,324

(22) Filed: Jun. 21, 1999

(51) Int. Cl.⁷ ................................................ F02C 7/06
(52) U.S. Cl. ........................................................ 60/39.08
(58) Field of Search ................................. 60/39.08, 736, 60/734; 123/196 R, 198 C

(56) References Cited

U.S. PATENT DOCUMENTS

| | | | |
|---|---|---|---|
| 5,159,808 | * 11/1992 | Kast | 60/39.091 |
| 5,161,365 | 11/1992 | Wright . | |
| 5,168,703 | * 12/1992 | Tobias | 60/418 |
| 5,184,456 | * 2/1993 | Rumford et al. | 60/39.02 |
| 5,495,715 | 3/1996 | Loxley . | |
| 5,540,203 | * 7/1996 | Foulkes et al. | 123/446 |

* cited by examiner

Primary Examiner—Charles G. Freay
Assistant Examiner—William Rodriguez
(74) Attorney, Agent, or Firm—Jeffrey W. Astle

(57) ABSTRACT

The invention relates to an oil pump driven by a hydraulic motor, that is itself driven by fuel pumped by a remote fuel pump through the engine fuel line. The hydraulic fuel driven oil pump is particularly advantageous for use in a gas turbine engine, to reduce dependence on or completely eliminate the auxiliary gear box (AGB) conventionally used to mechanically connect various engine systems with an engine shaft. Separating the oil pump and other fuel/oil system components from the AGB enables the rationalization of these systems and allows designers to reconfigure systems into a compact unit including the oil pump, separator, oil tank, heat exchanger and filters for fuel and oil. Using pressurized fuel to hydraulically drive the oil pump frees the oil system from location restraints and operating limitations, and permits recovery of otherwise wasted energy from the fuel bypass circuit during idling and takeoff. The close correlation between fuel flow and oil requirements eliminates the energy waste in conventional system which pump oil at rates dependent on the speed of the AGB and engine rotation.

12 Claims, 1 Drawing Sheet

OIL PUMP

TECHNICAL FIELD

The invention is directed to an oil pump driven by a hydraulic motor, that is itself driven by the motion of fuel pumped by a remote fuel pump through the engine fuel line, particularly for use in a gas turbine engine.

BACKGROUND OF THE ART

Conventional engines include a fuel circuit which conducts fuel with a fuel pump from a fuel tank to the combusters. In general, a separate lubricating oil system is provided to circulate oil between bearings and other moving components and an oil tank through an oil pump, oil filter and optionally through a heat exchanger in a continuous cycle.

To heat the fuel sufficiently to avoid icing of the fuel filter, in gas turbine engines the oil and fuel circuits are both conveyed to a heat exchanger whereby the hot oil withdrawn from the bearings is cooled and cold fuel from the fuel tank is heated simultaneously. Conventionally, the fuel pump and oil pump are mechanical driven by an auxiliary gearbox mechanically connected to a rotating engine shaft. The engine shaft includes a gear which drives a radially extending power take-off shaft to the auxiliary gearbox. The auxiliary gearbox, in addition to driving the oil and fuel pumps, is used to drive a hydraulic pump for the aircraft hydraulic system, connects the starter/generator to the engine shaft and drives the oil/air separator as well as other oil and fuel system components.

The conventional auxiliary gearbox has proven reliable, however, due to the weight of gears and shafts, and the overall mechanical complexity, it represents a significant cost in engine weight and performance as well as increasing the cost of engine assembly and maintenance.

The speed of the auxiliary gearbox is necessarily dependent upon the rotation speed of the engine shaft. There is very little freedom for individual control of driven components and adaptability. If different components driven by the auxiliary gearbox would be optimally driven at different speeds at different times during engine operation, such optimum efficiency is sacrificed in order to keep the auxiliary drive system simple and avoid further weight penalties, or complexity in mechanisms and control systems.

The auxiliary gearbox therefore represents a significant drain on engine performance and it is not necessary the most efficient manner of powering these engine components. The current trend is to eliminate parts or reduce the number of separate parts, improve performance, reduce weight and reduce overall cost of the engine in design, manufacture, assembly and operation.

Regarding conventional oil pumps, the supply of oil is directly dependent on the speed of the engine since the oil pump is driven by the auxiliary gearbox that is driven by the engine shaft. The rotational speed of a conventional oil pump is much lower than the rotational speed at which the engine shaft rotates since oil would cavitate the oil pump otherwise. The stepping down of the rotational speed with mechanical gears involves significant cost in manufacture, maintenance and performance.

Further, there is no direct correlation between the engine rotational speed and the need for oil to cool and lubricate the bearings. During aircraft take-off the engine speed is high, the engine thrust is high. Consequently the load on the bearings and need for oil cooling of the bearings is also high.

However, at cruising speed and altitude, the aircraft's airspeed is high and therefore the engine speed is high as well. During cruising, the engine thrust is much lower than at takeoff. Due to the lower thrust and the cooler ambient air temperature at cruising altitude the demand for oil is much lower as well. However, since the conventional oil pump is driven at a rate dependant on the engine speed, unnecessarily large volumes of oil are circulated during cruising. As a result, energy is wasted in pumping the oil, and oil system components are subjected to unnecessary wear. Further, the temperature of oil withdrawn from the bearings is lower, due to shorter residence times within the bearing gallery, and as a result the exchange of thermal energy to the fuel is reduced thereby increasing the risk of ice buildup on the fuel filter.

It is an object of the present invention to eliminate or substantially reduce the dependence on an auxiliary gearbox; thereby improving engine efficiency and reducing weight and cost.

It is a further object of the invention to reconfigure the oil system of a gas turbine engine to combine various components together in a compact easily manufactured unit.

It is a further object of the invention to reduce the amount of energy wasted or unnecessarily consumed in driving the oil and fuel components with an auxiliary gearbox.

Further objects of the invention will be apparent from review of the disclosure and description of the invention below.

DISCLOSURE OF THE INVENTION

The invention relates to an oil pump driven by a hydraulic motor, that is itself driven by the motion of fuel pumped by a remote fuel pump through the engine fuel line.

The hydraulic fuel-driven oil pump is particularly advantageous for use in a gas turbine engine, to reduce dependence on or completely eliminate the auxiliary gearbox (AGB) conventionally used to mechanically connect various engine systems with an engine shaft.

Conventionally the AGB connects a starter/generator to rotate the engine shaft and initiate combustion, and thereafter the rotating engine shaft through the AGB mechanically drives the fuel pump, oil pump, oil/air separator, hydraulic pump, and other oil and fuel system components.

To avoid cavitation in a conventional positive displacement oil pump, the AGB must include gears to reduce the speed of rotation substantially increasing the weight and mechanical complexity of the AGB. However the fuel pump, starter/generator, oil/air separator can be run at high speeds directly connected to an engine shaft without gear reduction. The weight penalty and mechanical complexity of the AGB can be completely eliminated by directly connecting the starter/generator and oil/air separator to an engine shaft and driving the slower oil pump with a hydraulic motor itself driven by the motion of the flow of fuel in the fuel line.

The hydraulic system pump and fuel pump can be positioned within the fuselage or elsewhere driven by separate electric motors. Separating the oil pump and other fuel/oil system components from the AGB enables the rationalization of these systems and allows designers to reconfigure systems into a compact modular unit including the oil pump, oil/air separator, oil tank, heat exchanger, fuel filter and oil filter. Using pressurized fuel to hydraulically drive the novel centrifugal oil pump, frees the oil pump from location restraints and operating limitations.

Prior to takeoff and during takeoff a large portion of the fuel circulated by the fuel pump is diverted from the combustors through the fuel bypass circuit. Fuel is thereby readily available for takeoff but is held in a standby mode by rapidly circulating in the bypass circuit. The use of a hydraulically driven motor for the oil pump driven by the motion of fuel in the bypass circuit permits recovery of otherwise wasted energy from the fuel bypass circuit during idling and takeoff. Since engine thrust is highest during takeoff, the need for oil is also highest. The high fuel bypass flow and pressure at takeoff correlates to the need for oil flow therefore a fuel-driven hydraulic motor recovers otherwise wasted energy and reduces the need to cool the rapidly circulating bypass fuel.

The close correlation between fuel flow and oil requirements eliminates the energy wasted in conventional systems which pump oil at rates dependant on the speed of the AGB and engine rotation. Conventionally, the engine speed dictates the supply of oil however the need for oil is dependant on engine thrust not speed. At cruising altitude, the engine speed is very high due to the low air density and high aircraft airspeed, however the oil requirement is relatively low due to lower thrust and cooler air temperature. Pumping unnecessary oil at a high rate wastes energy and increases oil system wear.

Use of a hydraulic motor driven oil pump as opposed to a mechanically driven pump also reduces the peak oil pressure on engine startup. Hydraulic motors wind up to operating pressure much slower, permitting more gradual pressure increases and therefore the peak pressure at which the oil system is designed can be substantially reduced.

To summarize, the following advantages result from use of a fuel flow driven hydraulic oil pump:
1. the oil pump can be driven at any desired speed independent of the engine speed, by simply controlling the rate of fuel flow into the hydraulic motor of the oil pump;
2. the energy lost when fuel is recirculated in the bypass circuit can be recovered and used to pressurize the oil system;
3. the oil pump can be mechanically divorced from the engine resulting in freedom of positioning and rotational speed;
4. the high-pressure spikes associated with mechanically driven oil pumps on engine startup are eliminated removing the need for a cold start valve to relieve such pressure spikes;
5. since a hydraulic motor has a more gentle wind up to operating speed, the high torque associated with mechanically driven oil pumps can be eliminated; and
6. the oil pump, and hydraulic motor can be packaged in a compact modular unit combining oil/fuel manifold, oil and fuel filters, heat exchanger, oil tank, and oil scavenging jet pumps, to result in an adaptable unit for use in various engines.

In particular, the invention provides a fuel and oil system for a gas turbine engine including a fuel circuit with a fuel pump, and a fuel line communicating between a fuel source and an engine combustor, and an oil circuit including an oil pump with a hydraulic motor in communication with the fuel line and hydraulically driven by the motion of fuel supplied by the fuel line. Preferably the fuel line includes a fuel bypass circuit for diverting fuel to bypass the combustor and to recirculate within the fuel circuit, and the hydraulic motor of the oil pump is hydraulically driven by the motion of fuel supplied by the fuel bypass line.

The bypass circuit includes an oil pump control for regulating the flow of oil through the bypass line, such as a bypass valve disposed in the fuel line downstream of the fuel pump and communicating with the fuel bypass line. A compact unit can combine a fuel filter, an oil filter, and heat exchanger disposed in the fuel and oil circuits for effecting heat transfer of thermal energy between the fuel and oil circulating therethrough, with the fuel filter, heat exchanger and oil filter being disposed on a common manifold and the oil pump being mounted to the manifold as well.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawing wherein.

DETAILED DESCRIPTION OF PREFERRED EMBODIMENTS

Figure 1:
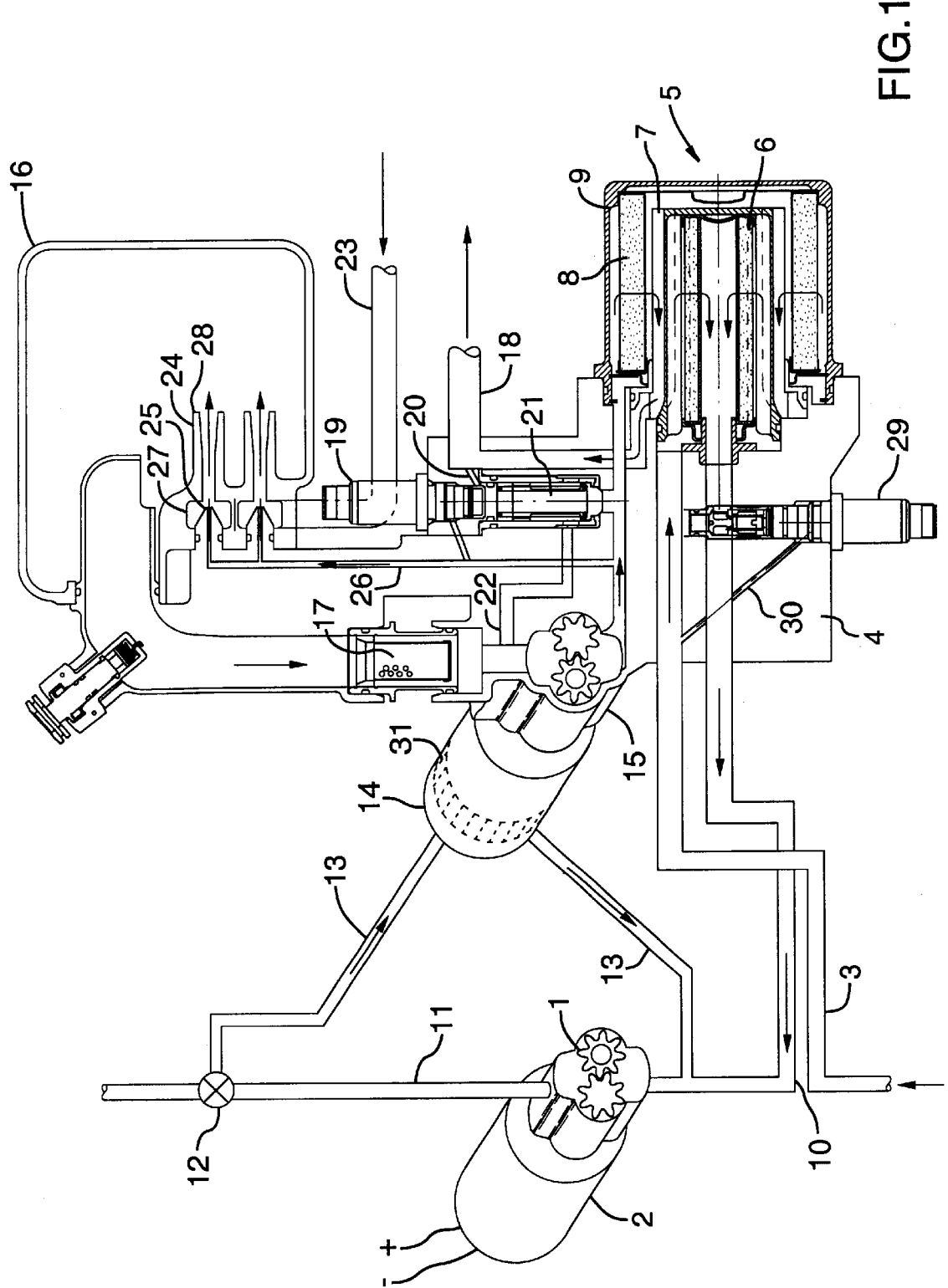
FIG. 1 is a schematic view of the oil circuit showing an electrically driven fuel pump, and a fuel-driven hydraulic motor driving an oil pump with fuel and oil circulation indicated with arrows throughout.

FIG. 1 illustrates an embodiment of the invention showing a fuel and oil system for a gas turbine engine as follows.

The fuel circuit includes a fuel pump 1 of a conventional positive displacement type driven by an independent electric motor 2. Depending on the application, the fuel pump 1 can also be of centrifugal type and may be driven by any conventional means suitable for aircraft use. The fuel circuit includes an input fuel line 3, which draws fuel from a fuel source such as a fuel tank. The input fuel line 3 connects to a manifold 4 on which is mounted a combined unit 5 which houses a fuel filter 6, heat exchanger 7 and oil filter 8 within a common housing 9. The fuel filter 6, heat exchanger 7, oil filter 8 and housing 9 are all nested and cylindrical in shape about a concentric axis. This combined unit provides several advantages in mounting to the common manifold 4 including reduction in piping, improved heat exchange and protection from fire and impact damage.

The input fuel line 3 connects to the manifold 4 and fuel is conveyed through the fuel filter 6 and exits from the manifold through fuel line 10. Fuel line 10 connects to the inlet port of the fuel pump 1 and output fuel line 11, propels the fuel past the bypass valve 12 to the engine combustors. The output fuel line 11 includes a fuel bypass conduit 13 which in conjunction with the bypass valve 12 provides means for diverting fuel to bypass the combustors and recirculate within the fuel circuit. Conventionally, a bypass circuit is used merely to hold fuel in a standby position for ready injection to the combustors.

In the present application, the fuel bypass conduit 13 connects with the hydraulic motor 14 of the oil pump 15. The hydraulic motor 14 is hydraulically driven by the motion of fuel supplied by the fuel bypass line 13. The bypass valve 12 disposed in the fuel line downstream of the fuel pump provides means to control the quantity of fuel flowing through the fuel bypass conduit 13 and therefore controls the speed at which the hydraulic motor 14 rotates and operates the oil pump 15. Oil is drawn from the oil tank 16 through a screen 17 and into the intake of the oil pump 15. Advantageously, the oil pump 15, the oil tank 16, and other components of the oil circuit are mounted to the manifold 4 in a compact unit. The outlet of the oil pump conveys oil through the oil filter 8 which is passed over the heat exchanger 7 and proceeds outward to the bearings through conduit 18. The counter current flow of oil and fuel across opposing sides of the heat exchanger surface 7 effects the transfer of thermal energy between the fuel and oil circulating in their independent circuits.

In the event that the oil filter 8 becomes clogged with debris, the oil circuit includes a oil filter bypass switch 19 to permit oil to pass through orifice 20 when open thereby bypassing the oil filter 8. The oil circuit also includes a cold start valve 21 housed within the manifold 4 to divert oil to bypass the oil filter 8 and to bypass the oil pump 15 through conduit 22; thereby reducing the peak oil pressure on initial start up of the engine.

Oil is drawn back into the oil tank 16 from the bearings through conduit 23 by jet pumps 24. Jet pumps 24 are preferred to the conventionally used positive displacement pumps for a number of reasons. Jet pumps 24 are very low in weight and cost, and have no moving parts. They are compact and inexpensive alternatives for scavenging oil from bearing cavities. The jet pumps 24 include a nozzle 25 through which is ejected a stream of high-pressure oil conducted from the oil pump 15 through the conduit 26. Oil and air mixture from the bearing cavities is drawn into conduit 23 and a plenum 27 immediately adjacent the nozzles output 25 by Venturri vacuum action as oil is ejected through the outwardly flaring outlet 28. Jet pumps 24 are better able to scavenge air/oil mixtures, give lower pressure drops and higher pressure rises than positive displacement pumps, require no bypass valves and can be positioned at the lowest point in the oil scavenging system. Of advantage in the embodiment illustrated, the jet pumps 24 and oil tanks 16 can be conveniently located within the manifold 4.

In the event that the fuel filter 6 becomes iced or otherwise plugged with debris the fuel circuit includes a fuel filter bypass switch 29 housed within the manifold 4 whereby fuel conducted through input fuel line 3 can bypass the fuel filter 3 via conduit 30 and proceed to the fuel pump 1 via fuel line 10.

It will be apparent to those skilled in the art that the design of a hydraulic motor 14 can include any conventional means powered by the flow of fuel such as a vaned turbine 31 or positive displacement rotors 31 depending on the application.

Although the above description and accompanying drawings relate to a specific preferred embodiment as presently contemplated by the inventor, it will be understood that the invention in its broad aspect includes mechanical and functional equivalents of the elements described and illustrated.

The embodiments of the invention in which an exclusive property or privilege is claimed are defined as follows:

1. A fuel and oil system for a gas turbine engine comprising:
   a fuel circuit including a fuel pump, and a fuel line communicating between a fuel source and an engine combustor;
   an oil circuit including an oil pump comprising a hydraulic motor in communication with the fuel line and hydraulically driven by the motion of fuel supplied by the fuel line.

2. A system according to claim 1 wherein:
   the fuel line includes fuel bypass circuit means for diverting fuel to bypass the combustor and recirculate within the fuel circuit, the bypass circuit means including a fuel bypass line; and wherein
   the hydraulic motor of the oil pump is hydraulically driven by the motion of fuel supplied by the fuel bypass line.

3. A system according to claim 2 wherein the bypass circuit includes oil pump control means for regulating the flow of oil through the bypass line.

4. A system according to claim 3 wherein the oil pump control means comprise a bypass valve disposed in the fuel line downstream of the fuel pump and communicating with the fuel bypass line.

5. A system according to claim 1 wherein;
   the fuel circuit includes a fuel filter, the oil circuit includes an oil filter, and heat exchanger means are disposed in the fuel and oil circuits for effecting heat transfer of thermal energy between the fuel and oil circulating therethrough;
   the fuel filter, heat exchanger and oil filter being disposed on a common manifold; and
   the oil pump being mounted to the manifold.

6. A system according to claim 5 wherein the oil circuit includes an oil filter bypass switch housed by the manifold.

7. A system according to claim 6 wherein the oil circuit includes cold start valve means for diverting oil to bypass the oil filter, the cold start valve means being housed by the manifold.

8. A system according to claim 5 wherein the fuel circuit includes a fuel filter bypass switch housed by the manifold.

9. A system according to claim 5 wherein the fuel filter, heat exchanger and oil filter are cylindrically nested on a common axis.

10. A system according to claim 5 wherein the oil circuit includes jet pump means for scavenging oil from engine bearings, the jet pump means being housed by the manifold.

11. A system according to claim 5 wherein the oil pump, and an oil tank are mounted to the manifold.

12. A system according to claim 1 wherein the hydraulic motor includes driving means, powered by the flow of fuel, selected from the group consisting of: a vaned turbine; and positive displacement rotors.

* * * * *